Aug. 10, 1965   A. G. BODINE, JR   3,199,614
SONIC WAVE SYSTEM FOR PLANTING UTILITY POLES IN THE GROUND
Filed Oct. 3, 1962   3 Sheets-Sheet 1
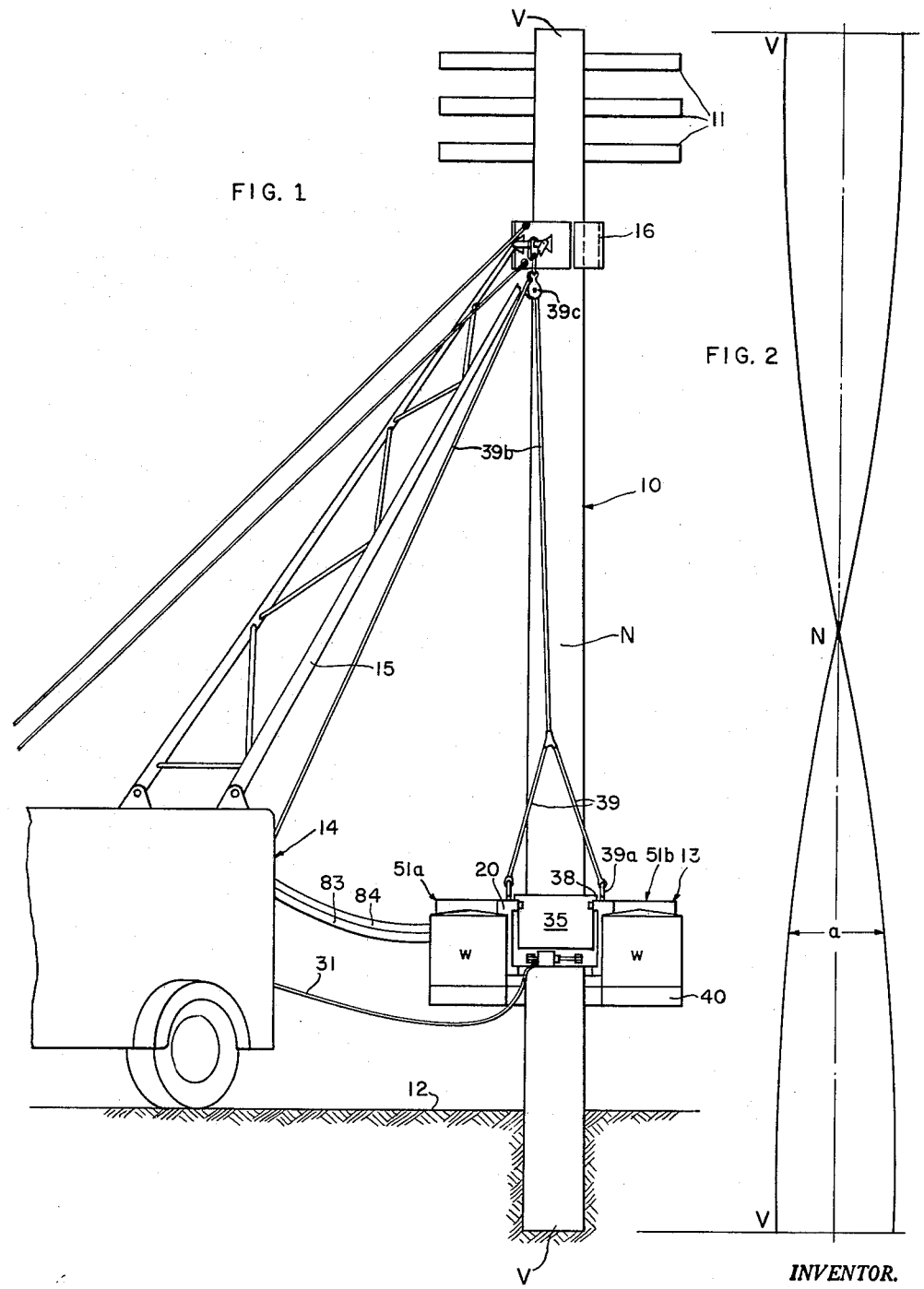
INVENTOR.
ALBERT G. BODINE JR.
BY
ATTORNEY

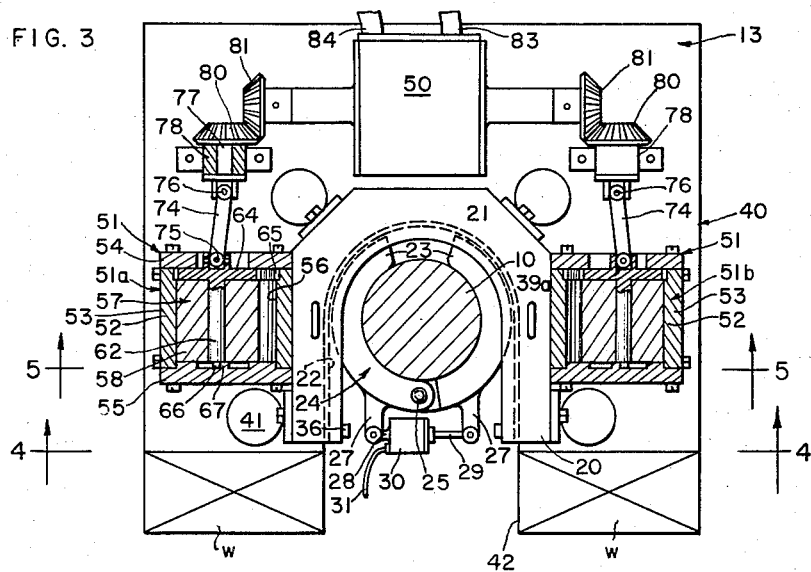

Aug. 10, 1965  A. G. BODINE, JR  3,199,614
SONIC WAVE SYSTEM FOR PLANTING UTILITY POLES IN THE GROUND
Filed Oct. 3, 1962  3 Sheets-Sheet 3

INVENTOR.
ALBERT G. BODINE JR.
BY
ATTORNEY

United States Patent Office 3,199,614
Patented Aug. 10, 1965

3,199,614
SONIC WAVE SYSTEM FOR PLANTING UTILITY POLES IN THE GROUND
Albert G. Bodine, Jr., Los Angeles, Calif.
(7877 Woodley Ave., Van Nuys, Calif.)
Filed Oct. 3, 1962, Ser. No. 228,085
11 Claims. (Cl. 175—19)

This invention relates generally to a unique and very greatly improved system for planting utility poles in the ground, such a power and telephone poles, without first digging a hole therefore, and utilizing certain novel sonic wave procedures and apparatus.

Utility poles are still planted by the old fashioned method of first digging a hole, then swinging the pole up from the ground and inserting its lower end portion into the hole, and finally filling in the hole around the pole with earth. Improvements have been made in equipment for carrying out this process, but the basic process has never, to the present time, been improved.

The general object of the invention is the provision of a system for planting a pole by positioning it with its butt end on the ground, and then setting up vibratory sonic wave conditions in the pole, in combination with a downward bias force thereon, which, acting together, cause the earthen material under the pole to fluidize and part, and the pole to settle rapidly in the ground.

A further object is to provide a utility pole planting system as proposed, characterized by the setting up of a resonant sonic standing wave action in the pole.

A still further object is the provision of means conveniently and practically applicable to a utility pole for driving the pole the necessary distance into the earth, using sonic standing wave principles and downward bias force application.

In accordance with the invention, broadly stated, the utilty pole to be planted is swung to the vertical position and centered over the point at which it is to be planted, using, for example, conventional pole handling equipment such as has been in common use in the past. The pole is positioned with its butt end in engagement with the ground, and laterally supported near the top to hold its vertical position. A sonic machine embodying a sonic wave generator is then clamped to the pole, usually at enough distance above the lower end of the pole that the pole can be driven down the necessary depth without this machine interfering by coming into engagement with the ground surface. The sonic wave generator is designed to set up a sonic standing wave in the pole, which, in case of either wooden or metal construction, is of material of such elasticity as will permit good standing wave vibration to be developed. The standing wave may be of various kinds, such as longitudinal orientation, and half-wavelength as the most usual example. Lateral and torsional waves may be used, and are of particular advantage with relatively short poles, or metal anchor rods and the like. In this connection, while I use the term "pole" in this specification to mean particularly the usual wooden utility pole, the invention is applicable not only to "utility poles," but to metal poles, pole anchors or other rods as well, solid or hollow, and the word pole is therefore to be construed herein and in the claims as of such breadth as to cover generically all forms of long slender pole-like members, solid or hollow, which may be erected and supported by the ground, including utility poles, and metal cable anchors or anchor rods therefor, or any other like member.

The preferred longitudinal half-wavelength mode of standing wave vibration action adverted to hereinabove is characterized by alternate elastic elongation and contraction of the pole. The two ends of the pole vibrate oppositely to one another, at maximized vibration amplitude, and these points are known as velocity antinodes of the wave. Between these velocity antinodes (approximately at the midpoint), vibration amplitude is minimized, or zero, and this point is known as a velocity node, or stress antinode, which means the same thing. The two half-portions of the pole, on opposite sides of this velocity node, elastically elongate and contract, in step with one another.

This half-wavelength standing wave is set up in the pole by the aforementioned sonic wave generator, which, in accordance with one novel feature of the invention, is clamped to the pole between its stress antinode and its lower extremity, and above the point on the pole which is to be driven to ground level. The sonic wave generator applies a vertically oriented alternating force to the pole, and this force, when regulated to resonance for the pole being driven, develops and maintains the standing wave.

It is necessary that the butt end of the pole be pressed against the ground by a biasing force. The weight of the pole and cross arms contribute to this biasing force. The weight of the sonic machine is also imposed on the pole, and this combination of weights is generally sufficient. Additional weight, if needed, may be imposed by loading weights onto the sonic machine clamped to the pole.

The standing wave set up in the pole implies that the sonic wave generator is operated at a longitudinal resonant frequency of the pole for standing wave behavior. The fundamental resonant frequency is given by $S/2L$, where S is the speed of sound in the material of the pole and L is its length. Such half-wavelength resonant standing operation thus represents the fundamental mode of operation, although harmonic frequencies may be employed, particularly with long metal poles.

Under the described combination of conditions, the lower or butt end of the pole bears heavily on the earth, and is also vibrated thereagainst through an amplitude of a small fraction of an inch, but with high acceleration, many times that of gravity, and with correspondingly high force impact. Under these influences, the earth material under the pole is fluidized and moves to the side, while the pole moves down into it. The lower end portion of the pole is rapidly buried; and when the vibration is stopped, the pole is very firmly embedded in laterally compacted earth.

To the precise point of clamping of the sonic machine to the pole requires some consideration. Acoustically speaking, the point of clamping can be anywhere excepting at or closely adjacent a stress antinode, and is ideally at a velocity antinode, i.e., at an end of the pole. In the case of a utility pole, e.g., bearing cross-arms at its upper end, the upper end is not conveniently available for application of the sonic wave generator, and the lower extremity is obviously completely unavailable. Assuming a half-wavelength standing wave pattern, a possible location for the wave generator is between the cross-arms and the stress antinode, and the preferred location, from every standpoint, is well below the stress antinode, and just above the point on the pole which is to be driven to ground level. This latter constitutes the preferred practice of the invention, and results in evident advantages found at no other point along the pole. It has been mentioned that overtone frequencies may be used, in which case there is more than one stress antinode. In this case, broadly, the point of clamping is to be spaced from both of these stress antinodes. At the same time, the point of clamping is to be spaced from both extremities of the pole, as required by such conditions as cross arms and the length of pole to be buried, and the preferred and most convenient case is a clamping point below the lower stress antinode.

The invention will be better understood from the following detailed description of certain present illustrative embodiments thereof, reference for this purpose being had to the accompanying drawings, wherein:

FIG. 1 is an elevational view of a utility pole which has been planted in the earth in accordance with the process of the invention and by means of sonic wave drive equipment shown applied to the pole;

FIG. 2 is a diagram of a longitudinal, half-wavelength standing wave such as may be set up in the pole of FIG. 1 in the performance of the invention;

FIG. 3 is a plan section taken in accordance with lines 3—3 on FIGS. 1 and 5;

FIG. 4 is a section taken on line 4—4 of FIG. 3;

FIG. 5 is a section taken on line 5—5 of FIG. 3;

Figure 3A:
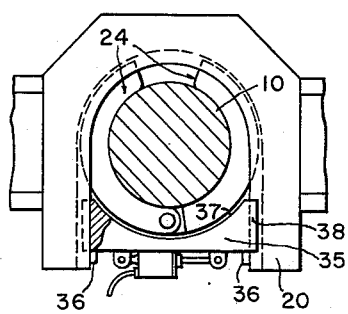
FIG. 3a is a fragmentary view of a portion of FIG. 3, showing the addition of a closure block.

In the drawings, there is indicated generally by the reference numeral 10 a common wooden utility pole, having cross-arms 11, which has been planted in the ground 12 to usual depth by the process and apparatus of the invention. Clamped to the pole 10, a short distance above ground level, is the sonic wave driving machine 13 of the invention. To one side of the pole is a conventional vehicle 14 such as is now used in pole planting operations of the conventional sort, and this vehicle 14 is shown as provided with the usual boom 15, carrying at the top a pole-encircling collar 16, understood to comprise two hinged sections which may be opened and then closed about the pole, often being controllably held closed by hydraulic pressure. These particular parts of the equipment, being old and conventional, need not be more than conventionally indicated in the drawings and will be fully understood by those skilled in the art without the necessity of further description or illustration. Suffice it to say that the boom 15 may be lowered to pick up the pole resting at ground level, the collar 16 manipulated to close around the pole, which it surrounds loosely, and the boom 15 may then be swung upwardly to lift the pole. The pole may be carried in vertical position by allowing the collar 16 to engage the lowermost cross-arm 11. The pole may actually be transported over the ground, carried in such a position, that is to say, hanging vertically from the collar 16, which is engaged with the lowermost cross arm. By this means, the pole is manipulated into a position at which it may be lowered so that its butt end rests at the point at which it is to be driven into the ground. The collar 16 may then be caused to slide downwardly somewhat on the pole, as to the elevation illustrated in FIG. 1, vehicle 14 being manipulated as necessary to accomplish this purpose. The collar 16 continues to support the pole in vertical position, and functions as a guidance means while the pole is driven. The pole is then ready for driving, and the sonic machine 13 is at this time brought into position and clamped to the pole. To this end, the sonic machine 13 may be gripped at a suitable location thereon by the jaws of a conventional front-end loader vehicle of conventional type (not shown), and carried thereby to the pole. Conveniently, the jaws of such machine may be of the type capable of vertical travel on the loader vehicle, so that the sonic machine 13 may be picked up, elevated, and positioned at the pole at a proper elevation for driving. In general, the sonic machine should ordinarily be placed as low as conveniently possible on the pole, consistent with the requirement that the machine must still be above ground level, and capable of again being easily picked up, after the pole has been planted.

A specific embodiment of the sonic driver machine 13, shown in the drawings as illustrative of one form which the invention may take in practice, will now be more particularly considered. It includes a U-frame 20 adapted to surround the pole 10, with clearance as indicated at 21 in FIGS. 3–5. The U-frame 20 is formed with an internal groove or way 22, which receives or fits onto the two arms 23 of a clamp 24 which is preliminary engageable with the pole 10 at selected height above ground level. The two arms 23 are hinged to one another, as at 25, and are arcuately formed in conformation to the circumference of the pole 10. Together, they may embrace a little less than the full circumference of the pole, as seen best in FIG. 3.

In accordance with the illustrative embodiment of the invention, the clamp 24 is applied to the pole first, and the rest of the sonic machine engaged with the clamp afterwards. Accordingly, the clamp 24, with its arms 23 swung apart, is elevated to the proper height (e.g., hand-lifted), and then closed on the pole. The arcuate inside surfaces of the clamp arms are formed with serrations 26 for good, non-slip engagement with the pole. The clamp is further furnished with means for forcing the clamp arms into very firm, non-slipping clamping engagement with the pole; and to this end the clamp arms 23 may be provided, adjacent hinge 25, with arms 27, to which are pivotably connected a pair of rods 28 and 29, of which rod 28 carries a hydraulic cylinder 30, and rod 29 a piston (not shown) in cylinder 30. A hydraulic line 31, extending from a controllable pressurized source (not shown) located on vehicle 14, conducts hydraulic fluid into cylinder 30 to expand arms 27 and thereby effect closure and tight clamping of clamp arms 23 about the pole. To release the clamp from the pole, the pressure fluid in line 31 is cut off from its pressure source, using for this purpose a suitable control valve, not shown, which not only shuts off the source of pressure fluid from the line leading to cylinder, but connects said line to "return," so as to exhaust pressure fluid from the cylinder, as is common in hydraulic systems servicing cylinder and piston type fluid motors. Obviously, if desired, pressure fluid could subsequently be fed into the opposite end of cylinder 30, and the clamp arms 23 thereby positively swung apart. It will usually be convenient, however, to spread the clamp arms apart manually once the pressure in line 31 has been relieved, and the sonic machine has been removed from the clamp.

Thus, to summarize briefly, the first step in the preferred practice of the present process is to place the pole in a vertical position, with its butt end resting on the ground at the point at which it is to be "planted." The next step comprises the engagement of the clamp 24 with the lower end portion of the pole, at a sufficient elevation that the sonic driving machine (which is to be engaged over the clamp) will clear the ground surface sufficiently as to be still above ground level when the pole has been sunk to the fully driven position illustrated in FIG. 1. In engaging the sonic machine with the clamp, the machine, understood to be supported by any suitable lifting equipment, preferably a front-end loader of the conventional type mentioned hereinabove, is positioned at the proper elevation, and then so moved, horizontally, that the U-frame 20 slides on over the clamp, the pole thus becoming positioned inside the arms of the U-frame. To assure retention of the U-frame in its proper engaged position with the clamp, an arcuate block 35 (see FIGS. 3a and 1) may be inserted between the extremities of the arms of the U-frame after the latter are around the clamp and pole, behind or inside a pair of positioning abutments 36, and with its arcuate surface 37 in opposition to the clamp. This block 35 may have a shoulder 38 at the top to overhang a portion of the U-frame and thus be vertically supported thereby.

In lieu of the front-end loader, referred to hereinabove, the sonic machine may be transported to the foot of the pole by any other means desired. It can then be elevated, as by a sling 39 connected to eyes 39a set in U-frame 20, and a line 39b extending over a block 39c carried by collar 16. So elevated to proper height, the sonic machine may easily be manipulated into proper engagement with the clamp 24 which has previously been set onto the pole.

The sonic machine 13 further includes, at a level a few inches below U-frame 20, a U-shaped platform 40, suspended from U-frame 20 by spring devices 41, more particularly described hereinafter, and whose U-shaped slot or opening 42 is oriented in corresponding with the U-frame 20, so that the U-frame 20 and U-platform 40 may be moved "onto" the pole together. The spring devices 41 might be simple helical tension springs, though I prefer and here show springs of an air-cushion type. Thus, a plurality of pneumatic cylinders 44 (FIG. 4), here four in number, are suitably secured at spaced points to the U-frame 20, and working in these cylinders 44 are pistons 45, to which are connected piston rods 46 extending downwardly and secured at their lower extremities to the platform 40. Air under suitable pressure is introduced to the lower ends of the cylinders 44 via air hoses 48, and the upper ends of the cylinders may be vented to atmosphere, as by ports 49. Air is supplied to air hoses 48 from a suitable pressurized source of supply, not shown, and it will be understood that the pressure of this air is regulated to support the pistons 45 normally in an intermediate position in the cylinders 44, as shown, so as to permit a substantial degree of vertical vibratory movement of the cylinders 44 with U-frame 20 without danger of engagement of the pistons with the ends of the cylinders. Air pressure regulating devices suitable for this purpose are known and need not be disclosed herein.

This U-shaped platform 40, as thus described, mounts at the back a suitable motor 50 for driving a sonic wave generator generally designated by the number 51, and which will be presently described, and it mounts also, on its two extremities, a pair of counterbalancing and bias weights w. Thus the motor 50 is counterbalanced by the weights w, and the motor 50 and weights 52 constitute a gravity load on the platform 40. The weight of these units plus the weight of the platform 40 is suspended from the relatively massive U-frame 20, which is in turn engaged with the clamp 24 set onto the pole. It will be appreciated from the scale of the drawings that the components mentioned are relatively massive in character, and to act to impose a relatively heavy downward bias loading force on the pole at the point of clamping by the clamp 24. As will appear, the weight of the presently described sonic wave generator is added to and becomes a part of the bias loading.

The sonic wave generator 51 is of a general type first disclosed in my prior application entitled Vibration Generator for Resonant Loads and Sonic Systems Embodying Same, Serial No. 181,385, filed on March 21, 1962. This generator is disclosed in the present application in a somewhat simplified and diagrammatic fashion. For a more complete and detailed disclosure of a preferred form of the generator the application referred to should be consulted.

As here shown, the generator 51 is separated into two separate but identical units 51a and 51b, synchronized and cooperating with one another. The two units 51a and 51b each embody an exterior housing 52, and these two housings are secured, as by studs 42a (FIG. 4) to opposite legs of U-frame 20. Each housing 52 comprises an intermediate cylindrically bored body member 53, with its bore 56, horizontal and parallel to the corresponding leg of the U-frame, together with opposite end plates 54 and 55. The bores 56 in body members 53 contain inertia rotors designated generally by the numeral 57, and constitute raceways for said rotors. Each such rotor 57 embodies an inertia roller 58, of somewhat less diameter than the corresponding raceway bore 56, and which is rotatably mounted on an axle 62 projecting axially from the hub portion of a spur gear 64. The pitch circle of this spur gear 64 is of substantially the same diameter as the roller 58. Gear 64 meshes with an internal gear 65 mounted within housing body 53 concentrically with the corresponding raceway bore 56, and whose pitch circle is substantially of the same diameter as said bore.

Each rotor 57 is designed to move in an orbital path about its raceway bore 56 as a guide, with gear 64 in mesh with internal ring gear 65, and with inertia roller 58 rolling on the bearing surface afforded by the raceway bore 56. To maintain the roller 58 in proper engagement with the raceway 56 while the generator is at rest, or coming up to speed, the axle 62 of the rotor is provided with an axial pin 66 which rides around a circular boss 67 projecting inwardly from the side wall or end plate 55 on the axis of the raceway bore 56.

The two rotors 57 are driven through a pair of driveshafts 74, each of which has a universal joint coupling 75 to the corresponding spur gear 64. The shafts 74 are connected through universal joints 76 to shafts 77 journaled in bearings 78 supported from platform 40, and shafts 77 carry bevel gears 80 meshing with bevel gears 81 on the driveshaft of motor 50 mounted on platform 40. While this motor 50 may be of any type, for example, electric or hydraulic, I prefer and here indicate a hydraulic motor, and motor 50 is here shown as having intake and exhaust pipes 83 and 84 for hydraulic drive fluid furnished under pressure, and exhausted to "return" employing hydraulic equipment of conventional nature and which need not be further illustrated. It is however, desirable that the hydraulic equipment, which incidentally is conveniently supported on the transport vehicle 14, be equipped with means for varying the flow rate through the hydraulic motor 50, so as to permit adjustment of the drive speed of the rotors 57 to find and operate at the frequencies for resonance for any given utility pole to be driven. The hydraulic source equipment may thus, for simple example, include a means for providing a source of hydraulic liquid at a given elevated pressure, and control valve means by which this source fluid is supplied to hydraulic motor 50 at any desired pressure and flow rate, as well as turned on and shut off at will. Resonance may then be readily attained by simple regulation of the fluid flow rate to the motor by means of this control valve means.

The operation of the sonic vibration or wave generator comprised of the two intercoupled and commonly driven units 51a and 51b is as follows: An inspection of FIG. 3 will readily disclose that the two drive shafts 74 are driven in opposite directions by the drive motor 50. The shafts 74, thus driven in opposite directions, drive the two spur gears 64 in opposite directions around the internal gears 65, the two shafts 74 each moving in a conical gyratory fashion. The inertia rollers 58 roll on the bearing surfaces 56, so that the rotors 57 move in orbital paths about the raceways 56. The centrifugal forces developed by the rotors moving in these orbital paths results in exertion of pressure of the rollers 58 on the surfaces of the raceways 56. The rollers 58 turn at nearly the same rate of rotation as the gears 64, with any slight variation or creep therebetween accommodated by the rotatable mounting of the rollers 58 on gear shafts 62. The two inertia rotors, by reason of their centrifugal forces, thus exert gyratory forces on the housings 52. The rotors 53, however, are so phased that the vertical components of their motions are always substantially or nearly in phase or in step with one another, while the horizontal components of their motions are correspondingly opposed. This is accomplished in the orginal setting of the rotors by means of the interconnecting gearing. For example, as shown in FIG. 5, the rotors may be set so that they are at their extreme outermost positions simultaneously with one another. A slight modification of this arrangement will be mentioned presently, but for now, assume that the rotors reach their extreme outermost positions, as shown in FIG. 5, coincidentally. The rotors will then be seen to move horizontally with equal or opposed movements, and a little reflection will show that the horizontal components of the centrifugal forces exerted thereby on the housings 52 are equal and opposed and cancel within the housings 52 and the interconnecting U-frame 20. On the other hand, as may readily be seen, the gyrating rotors move vertically in step with one another, so the vertical components of the centrifugal forces exerted against the housings 52 are equal and in phase, and are therefore additive in a vertical direction. And since the housings 52 are rigidly connected to opposite sides of the U-frame 20, these housings exert on the U-frame 20 vertically oriented alternating forces which are in phase with one another. A single resultant vertically directed alternating force is thereby exerted from U-frame 20 through clamp 23 to the lower end portion of the pole 10 to which the clamp has been applied.

It will be observed that the type of wave generator disclosed has a desirable frequency set-up characteristic from drive motor input to vibratory output force applied to the pole, and that for each orbital trip of a given gear 64 and its corresponding inertia roller 58 around the inside of internal gear 65 and raceway bore 56, the shaft 74, gear 64 and roller 58 make only a small fraction of a complete revolution on their own axes. The shafts 74 thus gyrate in their conical paths at greater frequency than their own rotational frequency on their own axes. Thus the orbital frequency of the inertia rotors 57, and the vibration output frequency of the generator housings 52, is correspondingly multiplied over the rotational frequency of the driveshafts 74. High vibration frequencies are thereby achieved without the use of high-speed motors, or large gear ratios between the motor and the vibration generator. A simple, low-speed drive motor may thus be used, and a vibration of high output frequency, such as will create a resonant standing wave in the utility pole, obtained therefrom in a simple manner.

The sonic wave or vibration generator comprised of the two synchronized units 51a and 51b is driven at a controlled speed to generate its output alternating force at a frequency such as will generate a longitudinal elastic standing wave in the pole 10. It has been pointed out that the vibration generator applies its vertically oriented alternating output force directly to the lower end portion of the pole. The generator will thereby generate a half-wavelength longitudinal standing wave in the pole and its frequency is made substantially equal to $S/2L$, where $S$ is the speed of sound in the material of the pole and $L$ is the length. Such half-wavelength standing wave operation is the fundamental mode of vibration, though harmonic frequencies may be employed if desired. Assuming, however, the half-wave mode of standing wave vibration, the pole, under the influence of the alternating force impulses applied to it as described, alternately elastically elongates and contracts. The center region of the pole stands virtually stationary, insofar as vibration is concerned, the wave at this point having a node N. The upper and lower end portions of the pole, on the other hand, vibrate through magnified displacement distances, and these regions of the wave are known as velocity antinodes and are designated at V. The behavior is diagrammed in FIG. 2, where the width of the diagram, such as at $a$, represents the amplitude of vibration at any point along the pole. It will be seen that the width of the diagram is reduced to zero at the point of the velocity node N (stress antinode), while the amplitude of vibration is maximized at the two end point velocity antinode V. Considering the location of the velocity node N, and taking into consideration the fact that the distance from the velocity node N to the velocity antinode V at the bottom of the pole is equal to a quarter-wavelength, it will be seen that the sonic machine has been clamped to the pole within the lower quarter-wavelength distance of the standing wave, and well below the velocity node N. Vibration amplitude being zero or substantially so at the velocity node N, the sonic machine cannot be clamped to the pole at that point if it is to drive the pole. The ideal point for coupling of the sonic machine to the pole is at a velocity antinode V. Obviously, it is impossible to couple the sonic machine to the pole at the lower velocity antinode V, and for purpose of utility pole driving, it would be highly difficult and inconvenient to attempt coupling to the pole at the velocity antinode V at the top of the pole. In accordance with the invention, therefore, the coupling point to the pole is selected within the lower quarter-wavelength of the standing wave, (i.e., below the center of the pole) and well down below the velocity node N, and towards the velocity antinode V, where vibration amplitude is substantial, as indicated by the width of the standing wave diagram of FIG. 2. The sonic machine must of course be kept sufficiently high on the pole that it will not engage the ground during driving. However, as will be easily recognized from FIGS. 1 and 2, the sonic machine may be clamped to the pole well down below the velocity node N, and at the same time conveniently above the lower end of the pole, while still reaching a point along the standing wave where vibration amplitude is very substantial, indeed, not much less than at the lower extremity of the pole. Such a point may be regarded as within the velocity antinode region.

As already stated, the process of the invention begins with the hoisting of the pole into an erect position, using hoisting and guidance equipment such as illustrated in FIG. 1, the pole being positioned with its butt end resting on the ground at the point at which it is to be planted, and the guiding collar 16 being lowered somewhat below the cross arms, so that it will not be engaged by the latter in the driving of the pole. Pole clamp 24 is then engaged with the pole, within the lower quarter-wavelength extent of the standing wave to be set up in the pole, and preferably well down from the node, as earlier described. The clamp is set tightly, as by the hydraulic means described previously, and the gripping serrations 26 and the pressure with which the clamp arms are forced against the pole are such as to afford a non-slipping grip capable of accommodating the high impedance condition prevailing at the point of engagement of the clamp with the pole. In this connection, the impedance at any point along the pole is proportional to the ratio of vibratory velocity amplitude to vibratory stress amplitude in the pole, and is at a relatively high magnitude at the point of clamping of the sonic machine to the pole when the pole is undergoing its earlier described elastic standing wave action. The meaning is that under the prevailing conditions of impedance, i.e., vibratory velocity amplitude in relation to vibratory stress amplitude, the clamping means and pressure employed are made adequate to apply the vertically oscillatory force impulses to the pole without occurrence of slippage between the clamping means and the pole.

The sonic machine is then transported to the pole and engaged with the clamp 24 and the pole. It was earlier described how this could conveniently be done by use of a front-end loader. Assuming use of such a vheicle, and assuming such vehicle to be provided with conventional gripping jaws for the work to be carried, such jaws may be adapted for gripping engagement with the platform 40 at the two sides of the drive motor 50. The loader vehicle may thus carry the sonic machine to the location of the pole. The gripping jaws of the loader vehicle are then elevated until the U-frame 20 is opposite the clamp 24, whereupon the machine is engaged with the clamp and the pole, the clamp being received in the way 22 of the U-frame 20. The closure block 35 may then be inserted, and the front-end loader vehicle disengaged from the sonic machine and backed away. Alternatively, the loader vehicle might remain engaged with platform 40, and the elevator mechanism for the jaws manipulated in such fashion as to elevate the front wheels of the vehicle off the ground, thus allowing a large portion of the weight of the vehicle to hang from the platform 40. This additional weighting of the apparatus can afford a convenient means for adding a large extra amount of downward biasing weight through the apparatus to the pole.

Motor 50 is then driven, and causes operation of vibration generator units 51a and 51b to set up a condition of vertical alternating force application to the generator housings, the U-frame 20, the clamp 23 and the pole at the clamp. This force application to the pole results in setting up of cyclically repeated compressional wave transmission in first one direction and then the other along the pole. The frequency of this alternating force can be adjusted so that these waves, reflected from the ends of the pole, reinforce and interfere with one another in a characteristic manner, well known to those skilled in the acoustics art, so as to create a resonant standing wave, as represented in FIG. 2. The frequency is thus adjusted, by control of the speed of drive motor 50, to approach or equal that for standing wave resonance in the pole, usually characterized by a longitudinal half-wavelength standing wave pattern, as diagrammed in FIG. 2. The finding of the proper operating frequency for the desired standing wave performance is very simple. The operator simply controls the speed until he finds the region at which vibration amplitude is maximized, and it is a very simple matter, in practice, to set the operation for peak vibratory amplitude, which is a condition denoting attainment of the desired resonant condition. When the conditions described in the foregoing have been attained, the butt end of the pole is not only pressed firmly against the ground by reason of its own weight and the weight of the sonic machine mounted on it, plus any additional biasing weight which may have been added, but is also sonically vibrated against the ground at the resonant frequency of the sonic wave set up in the pole. Under this combination of influences, the soil under the pole becomes agitated, loosened and fluidized, and moves out of the way to permit the pole to sink into it. The performance takes place rapidly, and while the soil originally under the pole is readily and rapidly broken up, fluidized and moved laterally, it is also compacted laterally, so that when the vibration is discontinued, the soil immediately surrounding the pole is highly compacted and affords very good support for the pole.

Under some conditions, the process can be facilitated by adding water to the area of the ground into which the pole is being driven. This water, which can be applied from a hose to the region around the pole while the latter is being driven, may in some cases increase the speed of penetration. The benefit of the water may be due to softening of otherwise hardened soil, or to a cavitation effect, or both. Use of water is not an indispensable requirement, but in some cases is a useful improvement.

The process as described is continued until a predetermined lower end portion length of the pole—a minor fraction of its total length—has been buried, and is then sharply interrupted. Since it is ordinarily desired to bury the pole to some exact distance, and since the pole sinks rather rapidly when driven by the present process, some attention must be given to accomplishing immediate interruption of the vibration of the pole when proper depth is attained. The process may of course be interrupted by shutting off supply of hydraulic fluid to motor 50. This is often adequate, but may not be sufficiently well controllable for precise pole setting, since the vibration generators 51a and 52a cannot be stopped instantly, and will drive the pole a little deeper after initiation of the effort to stop hydraulic motor 50. Substantially instantaneous stopping can be accomplished, however, by interrupting the vibration of the pole through release of the clamp 24 by suitable operation of the control valve supplying hydraulic liquid under pressure via line 21 to clamp locking cylinder 30, whereby the pressure held within said cylinder is relieved, and the clamp arms release their driving grip on the pole. The clamp arms 23 fit loosely enough in the way 22 in U-frame 20 to permit freeing of the pole therefrom. The sonic machine 13 must of course have vertical support at this time, or it would fall heavily to the ground. Such vertical support may be supplied by the sling 39 and line 39b.

When the pole has been driven to the necessary depth, and the driving operation terminated, the sonic machine is removed, the clamp removed, and the guidance collar 16 and boom 15 also removed. The pole is then solidly planted, and more solidly secured in the earth than if installed by the usual hole digging and fill method of the prior art.

Other modes of vibration can be used, either along with or in substitution for the longitudinal vibration or wave mode heretofore described. For example, by simply placing the two rotors 57 of the two generator units 51a and 52a a few degrees out of phase, the longitudinal mode will be preserved at nearly its full magnitude, while owing to the resulting lateral unbalance, a lateral component of vibration will be added. This lateral vibratory action, superimposed over the longitudinal wave mode, can be quite useful under certain circumstances.

Figure 6:
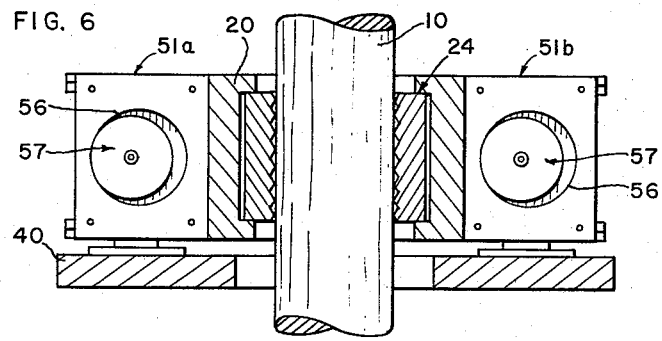
FIG. 6 is a view similar to FIG. 5, but showing a modification in the phase relationship of the rotors of the wave generating means.

FIG. 6 is a view similar to FIG. 5, and shows the two rotors 57 of the machine of FIGS. 1–5 to have been given a phase change of 180° as compared with the arrangement earlier described. That is to say, the inertia rotors 57 again rotate in opposite directions on their axes, but instead of moving equally and oppositely in the horizontal direction, they move horizontally in unison, and vertically in opposition to one another. Accordingly, a lateral instead of a vertical alternating force is generated and applied to the pole, and a lateral wave is propagated vertically along the pole. This force and resulting wave may be regulated in frequency to approximate the frequency of the pole for lateral standing wave resonance, so that a lateral standing wave can be obtained rather than a longitudinal standing wave. The sonic wave action in the vibratory pole is again, however, such as to effect a fluidizing action on the earth, causing rapid settlement of the pole as to the position shown in FIG. 1.

Figure 7:
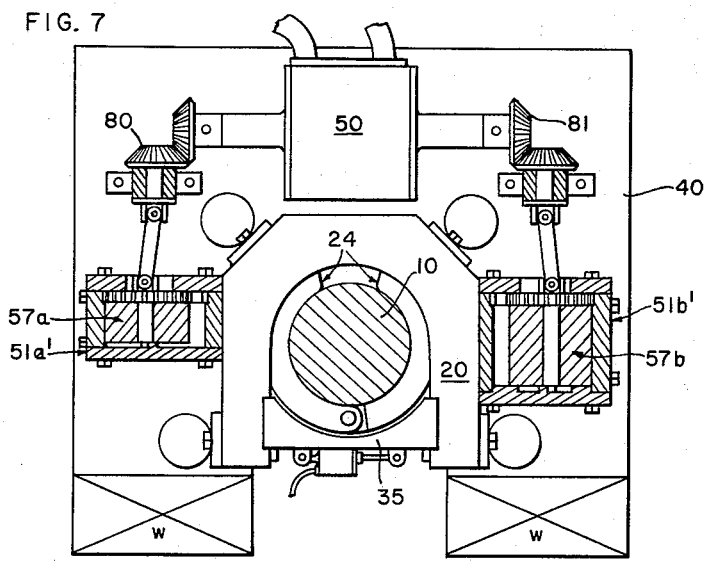
FIG. 7 is a view similar to FIG. 3 but showing a modification.

FIG. 7 is a view similar to FIG. 3, with corresponding parts identified by like reference numerals, but showing a modification by which there is applied to the pole a longitudinal wave, a lateral wave, and also a torsional wave. Any one of these can be caused to predominate by controlling the drive motor to operate the generator at the resonant frequency for the selected wave mode, longitudinal, lateral, or torsional. According to this modification, the rotor 57a for one generator 51a' is made to be of half the width of the rotor 57b of the other generator 51b' with the entirety of the mass of rotor 57a of generator 51a' on one side of a plane drawn perpendicular to the rotor and through the central vertical axis of the pole. The rotor 57b of the generator 51b' is bisected by said plane. Considering the longitudinal wave mode, the two inertia rotors of the two generators will cooperate to produce such a wave at the longitudinal resonant frequency of the pole. The wave will not be as strong as though the short rotor 57a were of full length, but will still be of substantial strength. The shortened rotor 57a will only balance half the lateral force component from the rotor of the generator 51b' of the other side; so that in this case, a lateral standing wave is also set up in the pole. To cause the latter to predominate, and the longitudinal wave mode to be subdued, it is only necessary to change the speed of drive of the motor 50 to attain a frequency in the range of resonance for the lateral wave mode. Under these conditions, the longitudinal wave action will thus be diminished in magnitude, and the lateral wave action emphasized.

Finally, the arrangement disclosed in FIG. 7 results in a torsional component of vibration, in addition to the longitudinal and lateral components mentioned above.

It will be seen that the half-length inertia rotor 57a, which is on one side of a vertical plane perpendicular thereto and passing through the vertical center line of the pole, exactly balances the portion of the full length inertia rotor 57b (of generator 51b') which is on the same side of said plane, insofar as torque effects about the axis of the pole are concerned. The half of rotor 57b which is on the other side of said plane, however, is not so balanced, and the centrifugal force component of this half of rotor 57b acts alternately along an effective horizontal thrust line passing to one side of the pole axis. A cyclic torsion is thereby created, and by setting the speed of operation to approximately that for the resonance for the torsional mode of standing wave vibration, a pronounced torsional mode of vibration will be attained, with longitudinal and lateral wave nodes at lesser magnitude.

The lateral or torsional modes, whose standing wave patterns are of reduced length as compared with the longitudinal wave mode for a given frequency, are particularly useful for short poles, or metal anchors or the like, all of which are broadly and generically included herein within the meaning of the word pole.

The method and apparatus of the invention may, by simple reversal of the biasing force, be employed to readily remove a long-planted pole from the ground. In this case, the biasing force must be upward, and can be applied as by pulling on lines such as the line 39b, or by exerting, in any other fashion, a steady hoisting force on the pole. The combination of wave action and hoisting force is effective to lift the pole easily from the ground.

It will be understood that the drawings and description are merely illustrative of certain forms which apparatus used in the invention may assume in practice, and that various changes in design, structure and arrangement may be made without departing from the scope of the appended claims.

I claim:
1. The method of planting in the ground a pole for utilities and the like, such pole being of elastic material and being capable of having a sonic elastic standing wave set up therein, characterized by velocity anti-nodes at the extremities of the pole and at least one intervening stress antinode, which comprises:
    positioning the pole vertically, with its lower end in engagement with the ground,
    clamping to the pole, at a position spaced below the lowermost stress antinode in the pole, a sonic wave generator capable of setting up in the pole a sonic elastic standing wave as aforesaid,
    allowing the weight of said wave generator to be imposed onto the pole and to constitute a bias loading thereon whereby the pole is pressed against the ground by virtue of its own weight plus that of said generator,
    operating said generator to set up said standing wave in the pole, whereby the pole is caused to descend into the earth,
    and discontinuing said standing wave in the pole when the lower end portion of said pole has been sunk a predetermined distance into the ground.

2. The process of claim 1, characterized further by clamping the sonic wave generator to the pole at a point below the location of the lowermost stress node in the pole and above the point on the pole which is to be lowered to the ground surface.

3. The process of claim 1, wherein the wave is discontinued in the pole as the pole reaches predetermined depth by suddenly unclamping the sonic wave generator from the pole.

4. A system for planting a pole into the ground to a predetermined depth which is a minor fraction of its length, said pole being of elastic material, so as to permit an elastic resonant standing wave to be set up therein, characterized by velocity antinodes at its extremities, and at least one intervening stress antinode, that comprises:
    means for supporting the pole in a vertical position with its lower end in engagement with the ground and resting thereon,
    a sonic vibration generator operable in the frequency range of said standing wave, and
    clamp means adapted to clamp said oscillator in sonic energy transmitting relationship to said pole below the lowest stress antinode of said standing wave.

5. A system for planting a pole into the ground a predetermined depth which is a minor fraction of its length, said pole being of elastic material, so as to permit an elastic standing wave to be set up therein, characterized by velocity antinodes at its extremities, and at least one intervening stress antinode, that comprises:
    means for supporting the pole in a vertical position with its lower end in engagement with the ground and resting thereon, and
    a sonic wave generator clamped to and supported by the pole at a point therealong spaced below the lowermost stress antinode in the pole and spaced above the point on the pole which is to be driven to ground level, said generator being adapted for setting up in the pole an elastic standing wave as aforesaid.

6. The subject matter of claim 5, wherein the wave generator is adapted to set up a longitudinal standing wave in the pole.

7. The subject matter of claim 5, wherein the wave generator is adapted to set up a lateral standing wave in the pole.

8. The subject matter of claim 5, wherein the wave generator is adapted to set up a torsional standing wave in the pole.

9. Apparatus for planting in the ground a pole for utilities and the like, such pole being of elastic material and being capable of having a sonic elastic standing wave set up therein, characterized by velocity antinodes at the extremities and at least one intervening stress antinode, that includes:
    body structure having a normally vertical, side-opening, pole-receiving passage therethrough adapted for lateral application to a pole,
    coupling means for coupling said body structure to a pole extending through said passage, whereby vibratory action of said body structure is exerted on said pole,
    and sonic wave generator means connected to said body structure for imparting to said body structure vibratory forces transmittable through said coupling means to said pole and adapted for setting up in said pole a sonic elastic standing wave as aforesaid.

10. The subject matter of claim 9, wherein:
    said coupling means comprises a clamp embraceable about said pole and capable of being rigidly clamped thereto, and
    wherein said body structure is detachably connectible to said clamp.

11. The method of planting in the ground a pole for utilities and the like, such pole being of elastic material and being capable of having a sonic elastic standing wave set up therein, characterized by velocity antinodes at the extremities of the pole and at least one intervening velocity node, which comprises:
    positioning the pole vertically, with its lower end in engagement with the ground,
    clamping to the pole, at a position within the lower half-length of the pole, and in the region of an antinode of the standing wave, a sonic wave generator capable of setting up in the pole a sonic elastic standing wave as aforesaid,
allowing the weight of said wave generator to be imposed onto the pole and to constitute a bias loading thereon whereby the pole is pressed against the ground by virtue of its own weight plus that of said generator,
operating said generator to set up said standing wave in the pole, whereby the pole is caused to descend into the earth,
and discontinuing said standing wave in the pole when the lower end portion of said pole has been sunk a predetermined distance into the ground.

References Cited by the Examiner

UNITED STATES PATENTS

| | | | |
|---|---|---|---|
| 2,743,585 | 5/56 | Berthet et al. | 74—61 |
| 2,867,984 | 1/59 | Desvaux et al. | 74—61 |
| 2,975,846 | 3/61 | Bodine | 175—19 |

FOREIGN PATENTS

| | | |
|---|---|---|
| 510,064 | 7/39 | Great Britain. |
| 726,660 | 10/42 | Germany. |

CHARLES E. O'CONNELL, *Primary Examiner.*